United States Patent [19]
Carlsten et al.

[11] Patent Number: 6,151,337
[45] Date of Patent: Nov. 21, 2000

[54] CONTINUOUS-WAVE RAMAN LASER HAVING A HIGH-FINESSE CAVITY

[75] Inventors: John Carlsten; Kevin Repasky; Jason Brasseur, all of Bozeman, Mont.

[73] Assignee: The Research and Development Institute, Inc., Bozeman, Mont.

[21] Appl. No.: 09/073,835

[22] Filed: May 6, 1998

[51] Int. Cl.[7] .................................................. H01S 3/30
[52] U.S. Cl. ............................................... 372/3; 372/69
[58] Field of Search ................................. 372/3–6, 69–71

[56] References Cited

U.S. PATENT DOCUMENTS

| | | | |
|---|---|---|---|
| 4,039,851 | 8/1977 | Jain et al. | 372/3 X |
| 4,530,097 | 7/1985 | Stokes et al. | 372/6 |
| 4,685,107 | 8/1987 | Kafka et al. | 372/6 |
| 4,717,842 | 1/1988 | Komine | 359/327 |
| 4,794,598 | 12/1988 | Desurvire et al. | 372/3 |
| 4,821,272 | 4/1989 | Brusselbach et al. | 372/3 |
| 5,033,051 | 7/1991 | Werner | 372/3 |
| 5,090,016 | 2/1992 | Dewhirst et al. | 372/3 |
| 5,153,887 | 10/1992 | Krapchev | 372/3 |
| 5,180,378 | 1/1993 | Kung et al. | 606/10 |
| 5,222,093 | 6/1993 | Pocholle et al. | 372/172 |
| 5,265,106 | 11/1993 | Garcia et al. | 372/3 |
| 5,272,717 | 12/1993 | Stultz | 372/3 |
| 5,375,131 | 12/1994 | Pocholle et al. | 372/3 |
| 5,414,723 | 5/1995 | Krapchev | 372/3 |
| 5,555,253 | 9/1996 | Dixon | 372/29 |
| 5,642,375 | 6/1997 | King et al. | 372/97 |
| 5,966,480 | 10/1999 | LeGrange et al. | 372/3 X |

OTHER PUBLICATIONS

K.S. Repasky et al., "High–finesse interferometers", Applied Optics, vol. 34, No. 15, May 20, 1995, pp. 2615–2618.

K.S. Repasky et al., "Frequency stability of high–finesse interferometers", Applied Optics, vol. 35, No. 4, pp. 609–611, Feb. 1, 1996.

J.K. Brasseur et al., "Maximizing the Finesse in a High Finesse Interferometer", 1997 Conference on Lasers and Electro–Optics, contributed paper, May 1997.

J.K. Brasseur et al., "CW Raman Laser", 1997 Conference on Lasers and Electro–Optics, contributed paper, May 1997.

*Primary Examiner*—John D. Lee
*Attorney, Agent, or Firm*—McDermott, Will & Emery

[57] ABSTRACT

The present invention provides a means to generate a Raman-shifted output from a pump laser source. Multiple embodiments all provide a manner of producing an off-resonant, continuous wave, Raman laser by using a pump laser source having a low power. This is accomplished by using a Raman medium within a cavity having a high finesse.

42 Claims, 9 Drawing Sheets

CONTINUOUS-WAVE RAMAN LASER HAVING A HIGH-FINESSE CAVITY

FIELD OF THE INVENTION

The present invention generally relates to third order non-linear optical devices, and in particular Raman lasers having a low pump laser source, a continuous wave and a highly turnable off-resonance beam.

BACKGROUND OF THE INVENTION

A Raman laser generally speaking comprises a pumping laser source which emits a pump source frequency, and a cavity containing a Raman medium. The laser pump source promotes a Stokes field in the cavity, thereby eliciting Raman scattering. Raman scattering occurs when an incident photon interacts with a molecule (or an atom) and generates a red-shifted photon with the change in wavelength resulting from the conservation of energy when the excitation in the molecule occurs. The energy E of a photon can be described as the product of its frequency $v$ and Planck's constant h (i.e. E=vh, where $h=6.63\times10^{-34}$ J-s).

It is readily apparent that when the incident photon having an energy E, interacts with a molecule (or atom) there is a transfer of energy. The contacted molecule (or atom) accepts the charge in energy, $+\Delta E$, which can be a form of molecular (or atomic) rotation/vibration, or electronic rotation/vibration. The photon, consequently, loses the change in energy, $-\Delta E$. This loss of energy, $-\Delta E$, is translated into a change in the associated frequency $-\Delta v$ of the photon. Because the frequency $v$ is inversely proportional to the wavelength $\lambda$ of the photon, it is clear that with a decrease in photon frequency $v$, there is a corresponding increase in wavelength $\lambda$.

Because the scattered photon is less energetic than the pump photon, the scattered photon has a longer wavelength. Having a resonant cavity containing the Raman medium therefore creates a Raman laser output beam. A desired Raman laser would be driven by a low powered pump source beam, be a continuous wave (cw) laser, and be widely tunable (attaining off-resonant scattering).

One type of prior art Raman laser includes those driven by a high-power pulse laser pump source. At high laser intensities the Raman process can have gain and produce stimulated off-resonant Raman scattering, and, because of the high intensities needed, off-resonant stimulated Raman scattering is most often studied in the high-power, pulsed regime. While these systems provide off-resonant Raman pulsed scattering, they are not provided in a continuous wave regime, and they require large amounts of power.

A second type of prior art Raman laser includes near-resonant Raman lasers driven by a continuous wave laser. Raman lasers use this inelastic scattering process to create Stokes-shifted outputs. However, because of the lower intensity of the cw pump lasers, these cw Raman lasers generally operate near a molecular (or atomic) resonance to increase the Raman gain and therefore are tunable only over narrow regions near the resonance. A few examples include a 67 $\mu$m cw Raman laser in $NH_3$, a cw Na Raman laser near the D lines, a two-photon-pumped cw Rb Raman laser near 776 nm, and various cw Raman lasers near Ne resonance in a He—Ne laser discharge tube. Although cw Raman lasers have been built to operate near a molecular or atomic resonance where the Raman gain is large, these lasers are tunable only over a narrow region near the molecular or atomic resonance. Furthermore, the pump wavelength needed for these cw Raman lasers is dictated by the energy-level structure of the molecule or atom. Consequently, while these systems provide Raman scattering in a continuous wave (cw) regime at a lower intensity to that compared to the pump actuated Raman lasers, they are tunable only over narrow regions near the resonance.

Finally, a third type of Raman laser includes those composed of optical fibers. Continuous wave Raman lasing is also possible in optical fibers in which the long interaction length of the fiber and the small spot size in the fiber increase the gain so Raman lasing can occur. However, input pump powers of ~1 W are typically needed to pump these Raman fiber lasers. In addition, the Raman shift in a fiber is only ~440 $cm^{-1}$, which is inconvenient if one is looking for substantial shifts of wavelength. While these systems do provide Raman scattering in a continuous wave (cw) regime, such lasers are driven at a moderate power level and additionally are tunable only over narrow regions near the resonance.

While the above prior art systems provide important advantages over one another, none of the systems provide all three desired features of a Raman laser as described previously, namely a low power pump laser source, a continuous wave, and a highly tunable or off-resonance laser beam. Accordingly, there remains a need for obtaining a highly tunable, continuous wave (cw) Raman laser with a low powered pumping source.

BRIEF DESCRIPTION OF THE DRAWINGS

The accompanying drawings, which are incorporated in, and constitute a part of the specification, illustrate exemplary embodiments of the present invention and, together with the description, serve to explain the principles of the present invention.

SUMMARY OF THE INVENTION

Figure 1:
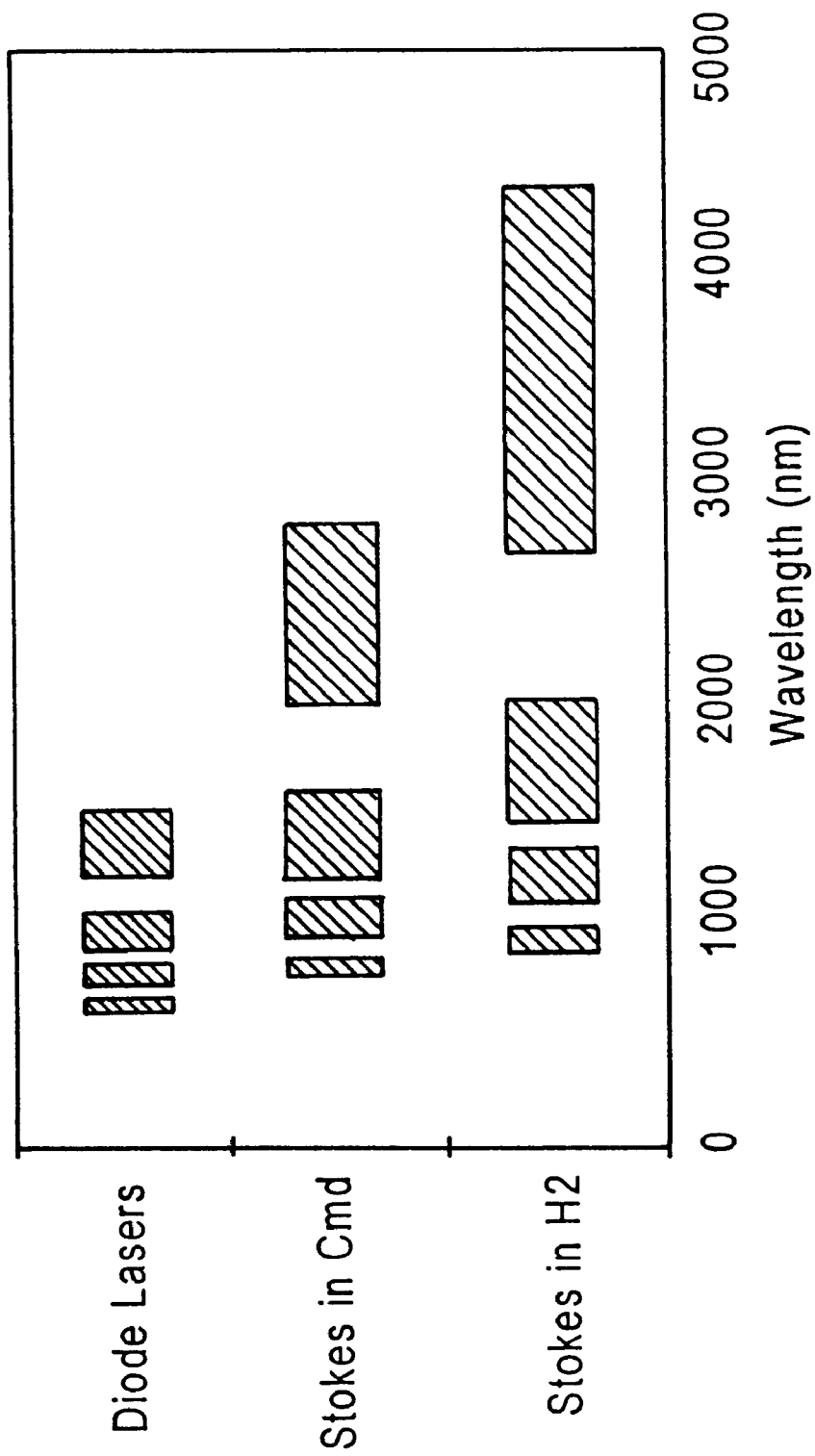
FIG. 1 depicts the energy levels in $H_2$ (to scale) used for the cw Raman laser of the present invention. This figure depicts wavelengths for available room-temperature laser diodes and the wavelengths these diodes can be shifted by use of Raman scattering in different Raman media according to the present invention.

The Raman laser of the present invention obtains the first desired feature, being widely tunable or being able to attain off resonant scattering, by using diatomic hydrogen as the Raman medium. Diatomic hydrogen is ideal for this feature because of its large Raman shift corresponding to the quantized separation of the typical rotational energy levels.

However, in order to induce a Stokes field out of spontaneous emission in a cavity having a Stokes medium, for example diatomic hydrogen $H_2$, a pump laser source is needed which can provide about 200 kilowatts. Presently there exist pulsed lasers that emit in the megawatt peak power range. However there are no cw lasers which emit in the 200 kilowatt peak power range. Lacking the availability of a 200 kilowatt cw laser, there arises a need to artificially lower the threshold needed to induce a Stokes field in order to emit a Raman shifted laser output. This lack leads to the second and third desired features in a Raman laser, namely a low-powered pump laser source in a cw mode of operation.

Driving the Raman laser with a low-powered pump laser source in a cw mode is accomplished by increasing the finesse of the cavity mirrors. The present invention is based in part on the unexpected discovery that an increase in the finesse of a laser cavity is directly related to the gain threshold to obtain a Raman scattering. Previous mirrors manufactured for use in lasers or Fabry-Perot cavities had a finesse ranging from about 50–100. Recent developments in thin-film coating technology however, have led to the availability of new mirrors with reflectivities of 99.995% and higher. These low-loss mirrors have been used to build nonconfocal cavities with a high finesse in the range of at least 50,000. By use of the nonconfocal cavity, the spot size on the mirrors is of the order of 100 $\mu$m. As a result, the degradation of the finesse that is due to wave front distortion on the mirror is minimized, thereby further increasing the finesse of the cavity.

With the advent of this new technology of high-finesse cavities it is now possible to consider using these cavities to do studies in nonlinear optics with cw lasers in the milliwatt range of power. Specifically, it is now possible to use these high-finesse cavities to build a widely tunable cw Raman laser that can be pumped with lasers at the milliwatt level. This low power requirement for pumping raises the possibility of driving these cw Raman lasers with compact and efficient diode lasers.

This scheme of driving a Raman medium in a high finesse cavity with a low-power pump laser source has eluded those in the art until the present time. It is widely known that the finesse of a cavity is related to the reflectance of the mirrors in the cavity in the following manner:

$$F=[\pi(r)^{1/2}]/(1-r) \qquad (1)$$

where r is the reflectance of the mirrors. Therefore, with an increase in finesse, there is a corresponding increase in the reflectance of the mirrors bounding the cavity. Furthermore, the light reflected off a mirror in the cavity, the light transmitted through a mirror in the cavity, and the light absorbed by a mirror in the cavity must equal the total amount of light incident upon a mirror in the cavity. Consequently:

$$L_T+L_A+L_R=1 \qquad (2)$$

where $L_T$ is the light transmitted through a mirror in the cavity, $L_A$ is the light absorbed by a mirror in the cavity, and $L_R$ is the light reflected off a mirror in the cavity. If, by using equation (2), the light reflected by a mirror in the cavity approaches 1 (the total amount of light incident upon the mirror), the amount of light transmitted and absorbed would approach zero. In other words, if the finesse of the cavity is extremely high, the reflectance of the mirrors in the cavity is therefore extremely high, thus increasing the amount of light incident upon the mirrors being reflected by the mirror. This in turn corresponds to a decrease in the amount of light absorbed and more importantly, the amount of light transmitted by the mirrors in the cavity. Those in the art, therefore, had not conceived of the notion of using a high finesse cavity in conjunction with a Raman medium because of the high pump power needed to obtain the Stokes field. If a high finesse cavity were used, the pump power would be attenuated by the amount reflected by the high reflectance mirrors, and would therefore decrease the ability to achieve a Raman shifted output unless an even higher powered pump lasers were used.

The present invention achieves that which the prior art Raman lasers have failed to achieve, namely obtaining a continuous wave off-resonant Raman laser driven by a low-power pump laser.

In one embodiment of the present invention, a Raman laser is provided with a low power laser pump. Additional specifics of this embodiment are provided which are drawn to the Raman laser being a continuous, off-resonant wave, wherein the pump laser power threshold is inversely proportionate to the square of the finesse. Further specifics of this embodiment are provided which are drawn to the type of pump laser, to the pump laser being tunable, and to one of the mirrors in the cavity being finely tuned by a piezoelectric element.

In another embodiment of the present invention, a Raman laser is provided with a continuous wave pump laser wherein the generated Raman shifted output is off-resonant. Additional specifics of this embodiment are provided which are drawn to the type of pump laser. Further specifics of this embodiment are provided which are drawn to the pump laser being tunable, and to one of the mirrors in the cavity being finely tuned by a piezoelectric element.

In yet another embodiment of the present invention, a laser is provided with a continuous wave pump laser and a high finesse cavity containing a Raman medium, wherein the finesse of the cavity is large enough to model a pump laser power threshold, required to sustain a Raman shifted wavelength, to an inverse proportionate square of the finesse. Further specifics of this embodiment are provided which are drawn to the type of pump laser.

In a further embodiment of the present invention, a laser is provided with a pump laser and a cavity containing a Raman medium, wherein the finesse of the cavity is large enough to model the pump laser threshold, required to sustain an off-resonant Raman shifted wavelength, to an inverse proportionate square of the finesse. Additional aspects of this embodiment are provided which are drawn to the pump laser being tunable. Further specifics of this embodiment are provided which are drawn to one of the mirrors in the cavity being finely tuned by a piezoelectric element.

In a further embodiment of the present invention, a laser is provided having a low powered pump laser and a cavity containing a Raman medium, wherein the finesse of the cavity is large enough to model the pump laser threshold, required to sustain an off-resonant Raman shifted wavelength, to an inverse proportionate square of the finesse. Further aspects of this embodiment are provided which are drawn to the Raman medium.

In yet further embodiments of the present invention, methods are provided for generating Raman shifted wavelengths.

Additional objects and attendant advantages of the present invention will be set forth, in part, in the description that follows, or may be learned from practicing or using the present invention. The objects and advantages may be realized and attained by means of the instrumentalities and combinations particularly pointed out in the appended claims. It is to be understood that the foregoing general description and the following detailed description are exemplary and explanatory only and are not to be viewed as being restrictive of the invention, as claimed.

DETAILED DESCRIPTION OF PREFERRED EMBODIMENTS

All patents, patent applications and literatures cited in this description are incorporated herein by reference in their entirety. In the case of inconsistencies, the present disclosure, including definitions, will prevail.

A steady-state concept that describes the performance of a cw off-resonant Raman laser is presented. The cw Raman laser is constructed in a nonconfocal high-finesse cavity that allows for high Raman gain with low pump powers. Threshold values of the pump laser used to pump the cw Raman laser are predicated to be 50%. The concept is compared with experimental results from a cw Raman laser that operates with a pump wavelength of 532 nm and a Stokes-shifted wavelength of 683 nm. A threshold pump power of 2 mW and a maximum photon conversion efficiency of 34%±6% was measured. With the mirrors used in the experiment, these values correspond to the predictions from the steady-state cw Raman laser concept. The theoretical model is then used to design cw Raman lasers operating near the maximum conversion efficiency in the 1-$\mu$m wavelength region (see Optical Society of America publication [S0740-3224(98)01106-0]).

Although cw Raman lasers have been built to operate near a molecular or atomic resonance where the Raman gain is large, these lasers are tunable only over a narrow region near the molecular or atomic resonance. Furthermore, the pump wavelength needed for these cw Raman lasers is dictated by the energy-level structure of the molecule or atom.

Building a cw Raman laser in a high finesse cavity (HFC) allows one to pump a Raman system far off the molecular or atomic resonance, because the high pump powers inside the HFC that result from the highly reflective mirrors translate to large Raman gains. A cw Raman laser that is built far off the molecular or atomic resonance has advantages over the cw Raman laser built near a molecular or atomic resonance. These advantages include a large range of pump wavelengths that can drive the Raman laser, which corresponds to a large tuning range.

With room-temperature diodes, Raman scattering in a HFC can be used to create lasers in the hard-to-reach 1–4 $\mu$m wavelength region of the spectrum. FIG. 1 shows the available room-temperature diode lasers and the Raman-shifted wavelengths that these lasers can reach in various Raman active media. These cw Raman lasers can find immediate applications in spectroscopy because many atmospheric molecules and pollutants have strong absorptions in the 1–4 $\mu$m wavelength region of the spectrum.

A steady-state concept describes the output Stokes power as a function of the input pump power for a cw Raman laser built in a nonconfocal HFC. This concept models the performance of the cw Raman laser, including the threshold condition and the Stokes power-conversion efficiency. From this concept, a relatively simple method for designing a cw Raman laser that operates near the maximum conversion efficiency is presented.

Experimental results from a cw Raman laser are presented. The output Stokes power was measured as a function of the input pump power and is compared with that predicted by the steady-state concept. The experimental results compare favorably with the predictions from the concept presented.

A novel method of continuous wave (cw) Raman scattering is presented in the present invention. The method comprises locking a relatively low power cw pump laser to a high finesse cavity (HFC). The cavity is locked such that both the pump and Stokes wavelengths are resonant with the cavity. If the HFC is resonant at both the pump and Stokes wavelengths and filed with a Raman medium, a Raman laser can be built with threshold below 1 mW.

With the recent advancements in mirror technology, highly reflective mirrors coated for multiple wavelengths with low absorption losses are now commercially available. These mirrors are currently used in high-finesse cavities (HFC's) that have finesses of 10,000–50,000. The power inside an HFC scales appropriately as the input power is multiplied by the finesses. For example, an interferometer with a finesse of 50,000 and an input power of 20 mW will have a power of 1 kW inside the cavity. The high power inside the HFC makes it possible to exploit nonlinear processes, such as Raman scattering, with low-power cw lasers, such as diode lasers and the like.

The cw Raman laser, in one example of the present invention, comprises an HFC filled with a Raman active medium, such as $H_2$. The HFC has two highly reflective mirrors (R>99.98%) with low absorption loss [A<15 parts per million (ppm)] and is set up in a nonconfocal cavity configuration with a mirror separation distance l, which is smaller than the radius of curvature of the mirrors, $R_v$.

While not wishing to be bound by any theory of operation, a steady-state concept that describes the output Stokes power as a function of the input pump power for a cw Raman laser is hereby developed.

The Stokes field is written as $$E_s(z,t) = \tfrac{1}{2} E_s(t) \exp(-iw_s t) u(z) + c.c, \tag{3}$$

where c.c. stands for the complex conjugate and $E_s(t)$ is the slowly varying envelope of the Stokes field, is a complex function of time, and includes the phase information. Here $\omega_s$ is the frequency of the Stokes field, and u(z) contains the spatial information and is written as $$u(z) = \sin(kz), \tag{4}$$

where $$kc = \frac{N\pi c}{l} = \Omega_1 \tag{5}$$

where c is the speed of light, $\Omega$ is the resonant frequency of the HFC cavity that is close to but not necessarily equal to the Stokes frequency $\omega_s$, and N is an integer. The polarization at the Stokes frequency is written in a similar manner as $$p_s(z,t) = \tfrac{1}{2} p_s(t) \exp(-iw_s t) u(z) + c.c, \tag{6}$$

where $p_s(t)$ is the complex slowly varying envelope of the polarization.

The wave equation that describes the growth of the slowly varying Stokes field $E_s(t)$ is $$\frac{\partial E_s(t)}{\partial t} = -i(\Omega - \omega_s) E_s(t) + \frac{1}{2} i \frac{\omega_s}{\epsilon} p_s(t)_1 \tag{7}$$

where $\in$ is the dielectric permeability of the Raman active medium. To understand the Raman gain, we next develop an expression for $p_s(t)$, the slowly varying envelope of the polarization that oscillates near the Stokes frequency.

The polarization can be written as $$p_s(t) = 2\exp(i\omega_s t) \frac{1}{M} \int_0^t u^*(z) Tr(Pp) dz; \tag{8}$$

where $$M = \int_0^t |u(z)|^2 dz$$

and is a normalization factor, P is the density matrix, and p is the polarization matrix where the $P_{mn}$ element of the matrix is $p_{mn} = e x_{mn} = e <m|x|n>$,. Here e is the electronic charge and Tr(Pp) stands for the trace of the matrix product of the density matrix and polarization matrix.

The Raman system for $H_2$ is a three level system with level |1>, the ground state, level |2>, the first excited electronic state, and level |3>, the first excited vibrational level. The trace of the product of the density matrix and the polarization matrix is given by $$Tr(Pp) = e(x_{21} P^{12} + x_{21}^* P^{21} + x_{23}^* P^{23} + x_{23} P^{22}) \tag{9}$$

In Eq. (9), only the $P^{23}$ term will oscillate such that $p_S(t)$ is slowly varying. Assuming that the HFC is on resonance so that $\Omega = \omega_S$ and using the equations for the density-matrix elements, one can use Eqs. (7–9) to obtain $$\frac{\partial E_s(t)}{\partial t} = G_s |E_p(t)|^2 E_s(t), \tag{10}$$

where $G_S$ represents the gain at the Stokes frequency and depends on the medium's parameters. One can write Eq. (10) in terms of the Stokes power by multiplying by $E_s^*(t)$ and noting that $|E_S(t)|^2$ is proportional to the Stokes power. The result is $$\frac{\partial \Pi_s}{\partial t} = 2 G_s \Pi_p \Pi_s - L_s \Pi_s, \tag{11}$$

where $\Pi_S(\Pi_P)$ is the Stokes (pump) power inside the HFC and $L_S$ is phenomenologically added to account for losses of the Stokes power that are due to transmission through the mirrors.

The gain ($G_S$) can be found from Eq. (11) (with $L_S=0$). The result is that $$G_s = \frac{c}{2l} \left[ \frac{4\alpha_g \tan^{-1}(l/b)}{\lambda_s + \lambda_p} \right], \tag{12}$$

where $\alpha_g$ is the plane-wave gain coefficient, $b = [l(2R_M - 1)]^{1/2}$ is the confocal parameter of the HFC, and $\lambda_S(\lambda_P)$ is the Stokes (pump) wavelength.

We can also find an expression for the loss term by setting the gain in Eq. (11) to zero. The Stokes power is then $$\Pi_S = \Pi_S(0) \exp(-L_S t), \tag{13}$$

But since this is the power inside the HFC, $\Pi_S = R\Pi_S(0)$ after a single pass that occurs in a time t=l/c. Thus, the loss $L_S$ is $$L_S = -(c/l) \ln(R). \tag{14}$$

In the steady-state limit, $\delta \Pi_S / \delta t = 0$, and this allows us to write a condition for the pump power inside the HFC, $\Pi_P$ as $$\Pi_p = \frac{L_s l(\lambda_s + \lambda_p)}{4c\alpha_g \tan^{-1}(l/b)}, \tag{15}$$

Now consider the diagram for the HFC shown in FIG. (2). The incident pump field is $E_0$, r is the field reflectivity of the mirrors, t is the field transmission of the mirrors, and d is the field depletion factor that accounts for the conversion of the pump field to the Stokes field inside the HFC. The depletion factor can range between 0 and 1.

Summing the pump field inside the HFC and squaring this sum leads to a result for the pump power inside the HFC. This result is $$\Pi_p = P_0 \frac{d^2 T}{(1 - \sqrt{(R)})^2}, \tag{16}$$

were $P_0$ is the input pump power, $T = t^2$ is the transmission of the mirrors, and $R = r^2$ is the reflectivity of the mirrors. In the steady-state approximation, the pump field reaches its steady-state value, and this is then converted to a Stokes field so that d is included only once per pass in this model.

From Eqs. (15) and (16), a condition which describes the depletion factor is reached:

$$d^2 = \frac{L_s}{2G_s}\frac{(1-\sqrt{R})^2}{T}\frac{1}{P_0}. \quad (17)$$

If d as calculated from Eq. (17) is larger than 1, then the Stokes losses are greater than the Stokes gain, and no conversion to Stokes will occur. In this case d is set to its upper limit of 1.

Figure 2:
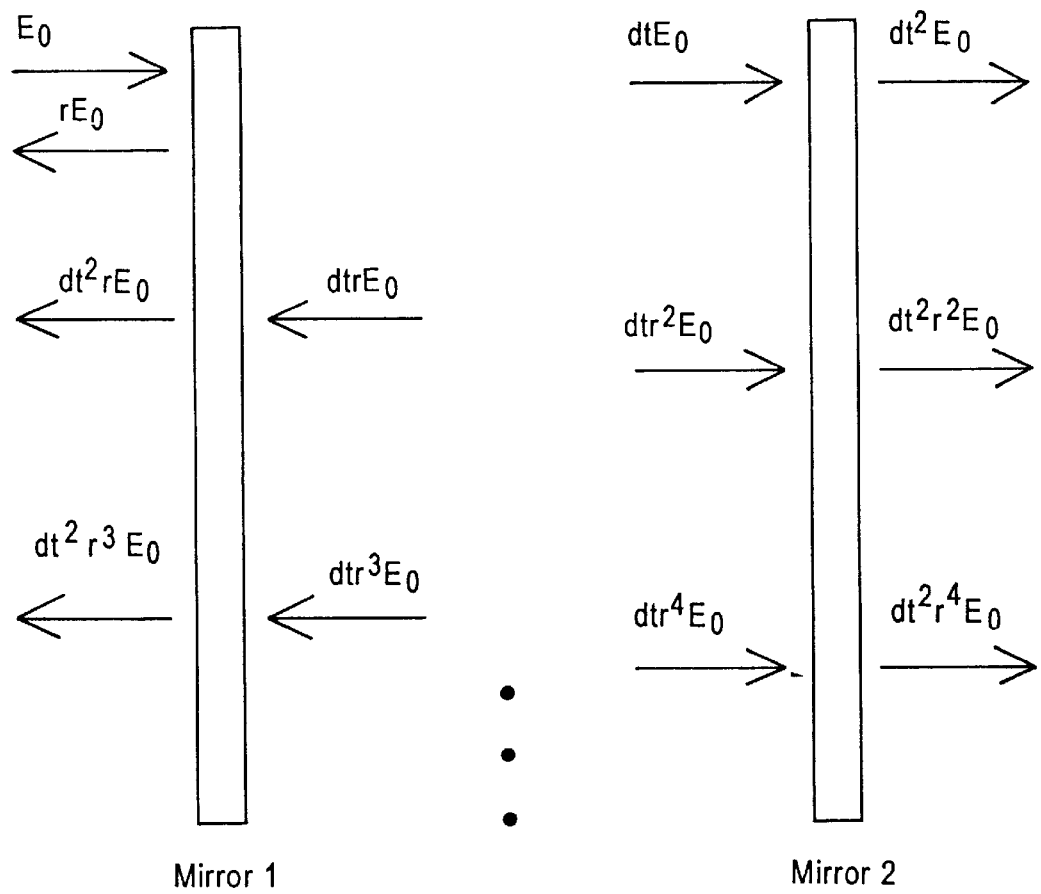
FIG. 2 is a schematic diagram of fields reflected from, and transmitted through and between the mirrors in a high finesse cavity in accordance with the present invention.

We can find the transmitted and the reflected pump powers by summing the reflected and the transmitted fields in FIG. 2. This leads to the total pump power outside the HFC, $P_P$, and is $$P_p = P_0\left[R\left(\frac{dT}{1-R}-1\right)^2 + \left(\frac{dT}{1-R}\right)^2\right], \quad (18)$$

where the first term on the right-hand side of Eq. (18) is the reflected pump power, while the second term is the transmitted pump power.

We can also find the absorption of the pump power at the two mirrors by summing the fields at each mirror, squaring to get the power, and multiplying by the mirror absorption A. The absorption of the pump power by the mirrors, Δ, is $$\Delta = AP_0\left[1 + \frac{d^2TR}{(1-R)^2} + \frac{d^2T}{(1-R)^2}\right], \quad (19)$$

The output Stokes power can now be found from energy conservation. The input pump power is $P_0$, while the unconverted pump power outside the HFC is $P_P$. The amount of pump power lost to absorption is Δ. So the total converted Stokes power is $$P_S = (\lambda_P/\lambda_S)(P_0 - P_P - \Delta), \quad (20)$$

where the ratio of the wavelengths is used to scale the power at the pump wavelength to that at the Stokes wavelength.

The Raman medium used for the calculations in one example is $H_2$, which has a Raman shift of 4155 cm$^{-1}$. The cavity length for this example is l=3 cm and the mirror radius of curvature is $R_m$=100 cm. The Raman plane-wave gain coefficient for a pump wavelength of $\lambda_P$=582 nm (795 nm, 1880 nm, 1550 mn) is $\alpha_g$=2.5×10$^{-9}$ cm/W (1.4×10$^{-9}$ cm/W, 0.58×10$^{-9}$ cm/W, 0.86×10$^{-9}$ cm/W).

The depletion factor d accounts for the amount of conversion of pump power to Stokes power inside the HFC and is defined by Eq. (17). The depletion factor ranges from 1 to 0, with d=1 corresponding to no Stokes conversion and d=0 corresponding to maximum Stokes conversion inside the HFC. When Eq. (17) is greater than 1, the losses of the HFC at the Stokes wavelength are greater than the Stokes gain, and the cw Raman laser is below threshold. In this case, d is set to its upper limit of 1. The threshold condition for a cw Raman laser is thus $$P_0(th) = \frac{L_s}{2G_s}\frac{(1-\sqrt{R})^2}{T}, \quad (21)$$

where $P_0$(th) is the minimum input pump power that is required for the Stokes conversion to start for the cw Raman laser.

Figure 4:
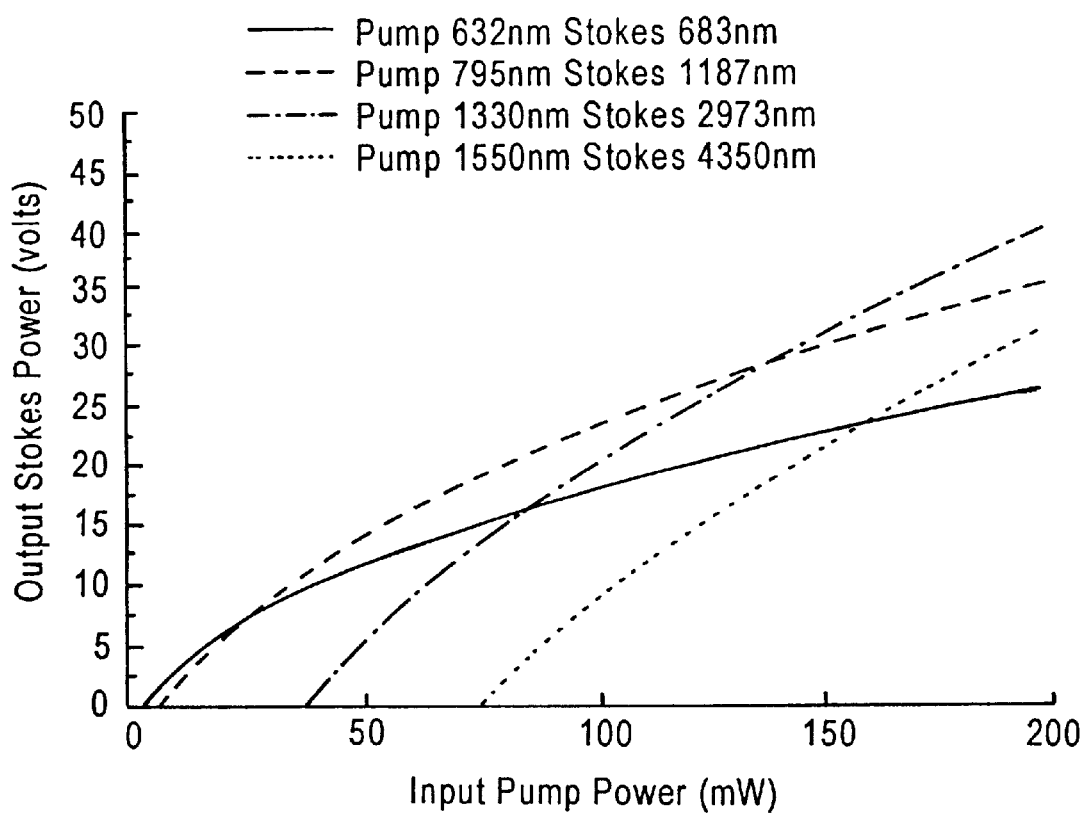
FIG. 4 is a plot of the output Stokes power as a function of the input pump power. Solid, dashed, dotted-dashed, and dotted curves denote pump lasers at 532, 795, 1330, and 1550 nm, respectively, and stokes-shifted wavelengths of 683, 1187, 2978, and 4350 nm, respectively. The mirror reflectivities at both the pump and the Stokes wavelengths are 99.98%, and the mirror absorptions at both the pump and the Stokes wavelengths are 15 ppm.

FIG. 4 shows examples of the output Stokes power as a function of input pump power for four different pump wavelengths. The pump wavelengths are 532 nm, which corresponds to a frequency-doubled Nd:YAG laser; 795 nm, which corresponds to diode lasers and Ti:Sapphire lasers; and 1330 and 1550 nm, which correspond to diode lasers used in telecommunications. The mirror reflectivities used in the calculations are R=99.98%, and the mirror absorptions are A=15 ppm at both the pump and the Stokes wavelengths. The effects of mirror reflectivity and absorption are studied below. Mirrors with these reflectivities and absorptions are commercially available. Thresholds range from 3 mW for a pump wavelength of 532 nm to a threshold of 72 mW for a pump wavelength of 1350 nm. One can reduce the threshold for the longer-wavelength pump lasers by increasing the cavity length of the HFC and thus increasing the gain.

Note in FIG. 4 that the output power levels off more rapidly for shorter wavelengths. At first glance this may seem surprising, but it is related to the maximum conversion efficiency being dependent on the gain. For shorter wavelengths the gain is higher, which leads to a lower threshold and a lower-input pump power for maximum conversion efficiency. Section 4 presents plots of conversion efficiency versus pump power for various reflectivities that show similar crossings (see FIG. 6 below, for example).

Figure 5:
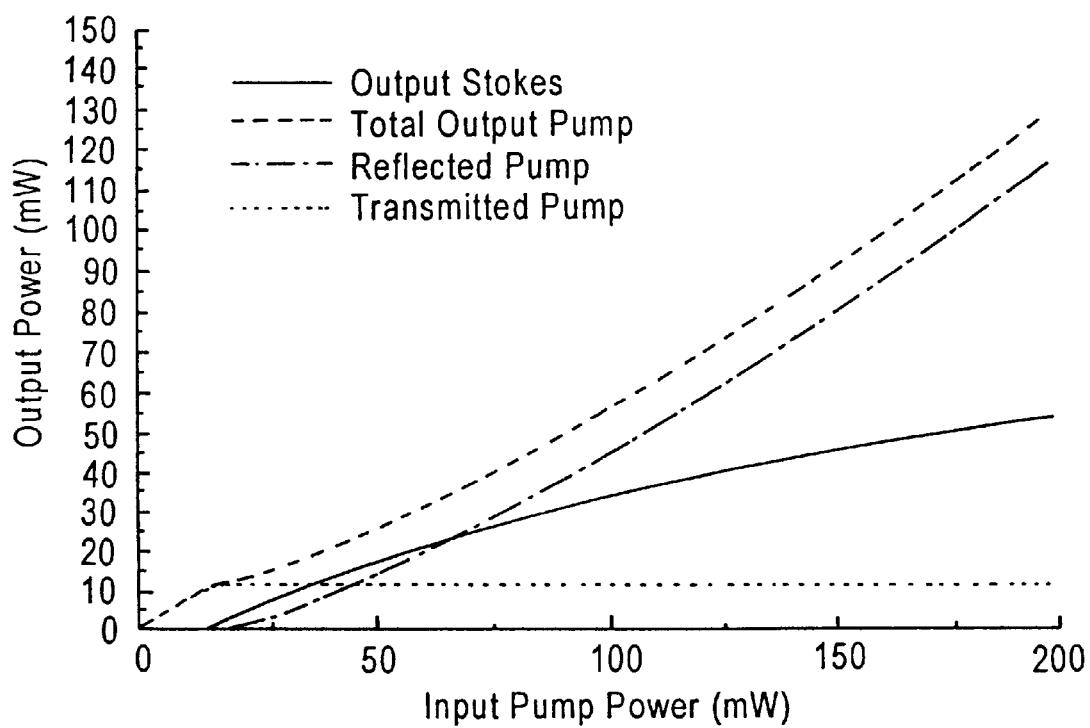
FIG. 5 is a plot of the Stokes output power (solid curve), the total output pump power (dashed curve), the reflected pump power (dotted-dashed curve) and the transmitted pump power (dotted curve) for a pump wavelength of 532 nm and a Stokes-shifted wavelength of 683 nm. The mirror reflectivities at both the pump and the Stokes wavelengths are R=99.95%, and the mirror absorptions at both the pump and the Stokes wavelengths are A=50 ppm.

FIG. 5 is a plot of the output Stokes power (solid curve), the total output pump power (dashed curve), the transmitted pump power (dotted curve), and the reflected pump power (dotted-dashed curve) for a Raman laser with a pump wavelength of 532 nm and a Stokes-shifted wavelength of 683 nm as a function of the input pump power. To show the threshold condition more clearly, the mirror reflectivities at both the pump and the Stokes wavelengths were set to R=99.95%, and the mirror absorptions at both the pump and the Stokes wavelengths were set to A=50 ppm. The threshold for the input pump power to start converting to Stokes power for this case is 15 mW. Below this threshold, the transmitted pump grows linearly with a slope of less than 1, because the mirror has some absorption. Above the threshold the transmitted pump power remains at a constant power. The reflected pump power below threshold is small but not zero. The reason the reflected pump power is not zero below the threshold value is that the mirror absorption caused the initial reflected pump beam not to be canceled by the subsequent pump beam that is leaked out of the cavity. The Stokes power grows above threshold when the pump power is converted inside the HFC. However, as the pump power is converted to Stokes power, the cancellation of the initially reflected pump beam by the cavity leakage is not complete. This is the reason that the reflected pump beam grows as the cavity is pumped harder. The ratio of output Stokes power of 50 mW is 88%, while at 200 mW this ratio is 27%. The ratio of the reflected pump power to input pump power at an input pump power of 50 mW is 84%, while at an input pump power of 200 mW this ratio is 65%.

The Stokes power-conversion efficiency for the Raman laser is defined as the ratio of the Stokes output power to the input pump power. The Stokes power conversion efficiency, $C_S$ can be written from Eqs. (18)–(20) as $$C_s = \frac{\lambda_p}{\lambda_s}\left\{T + d\frac{2TR}{1-R} - d^2(1+R)\left[\frac{T^2+AT}{(1-R)^2}\right]\right\}, \quad (22)$$

The Stokes power-conversion efficiency is a function of the depletion factor and hence a function of the input pump power. The Stokes photon-conversion efficiency, $C_{Ph}$, which relates the number of output Stokes photons to the number of input pump photons, is related to the Stokes power-conversion efficiency by the relationship $$C_{ph} = \frac{\lambda_s}{\lambda_p} C_s, \qquad (23)$$

Figure 6:
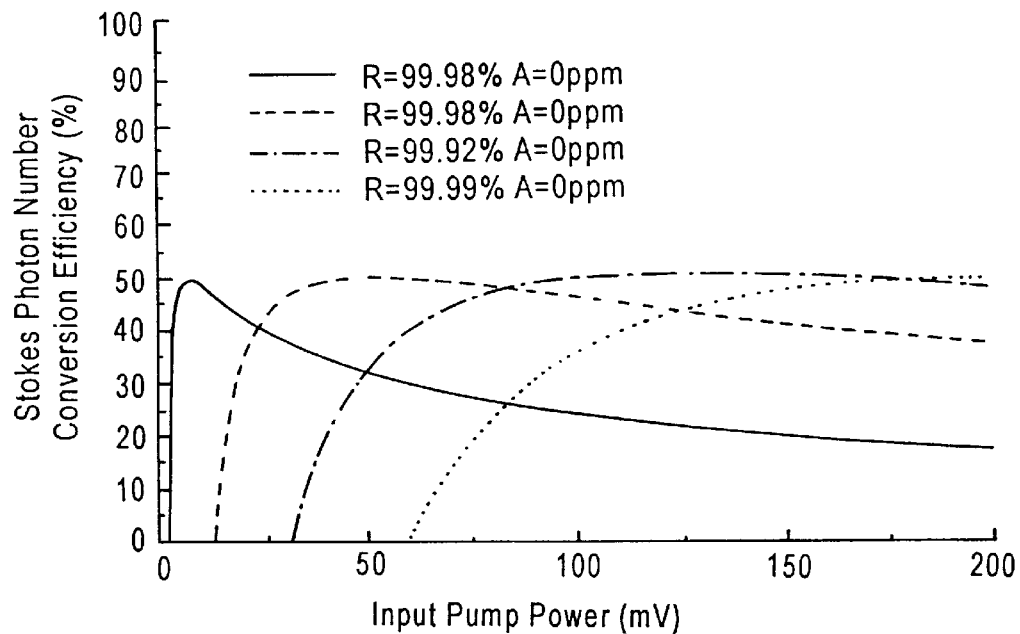
FIG. 6 is a plot of the Stokes photon-conversion efficiency as a function of input pump power. The pump (Stokes) wavelength is 532 nm (683 nm). The mirror absorptions at both the pump and the Stokes wavelengths are A=0 ppm. The solid, dashed, dotted-dashed, and dotted curves were calculated, respectively, for mirror reflectivities of R=99.98%, 99.95%, 99.92%, and 99.89%. The maximum photon-conversion efficiency for each mirror reflectivity is 50%.

FIG. 6 is a plot of the Stokes photon-conversion efficiency as a function of the input pump power. The mirror absorptions at both the pump and the Stokes wave-lengths are set to zero, and the mirror reflectivities at both the pump and Stokes wavelengths range from 99.89% to 99.98%. The threshold for the Stokes conversion increases as the mirror reflectivity decreases. The conversion efficiency for each of the four mirror reflectivities reaches a peak value of $C_{Ph}$(max)=50% and then falls from its peak value as the input pump is increased. Choosing the proper mirror reflectivities for a given input pump power is imperative to designing an efficient cw Raman laser. For instance, if an input pump power of 40 mW is being used to pump the Raman laser, then the most efficient cw Raman laser will be built with mirror reflectivities at R=99.95%.

Figure 7:
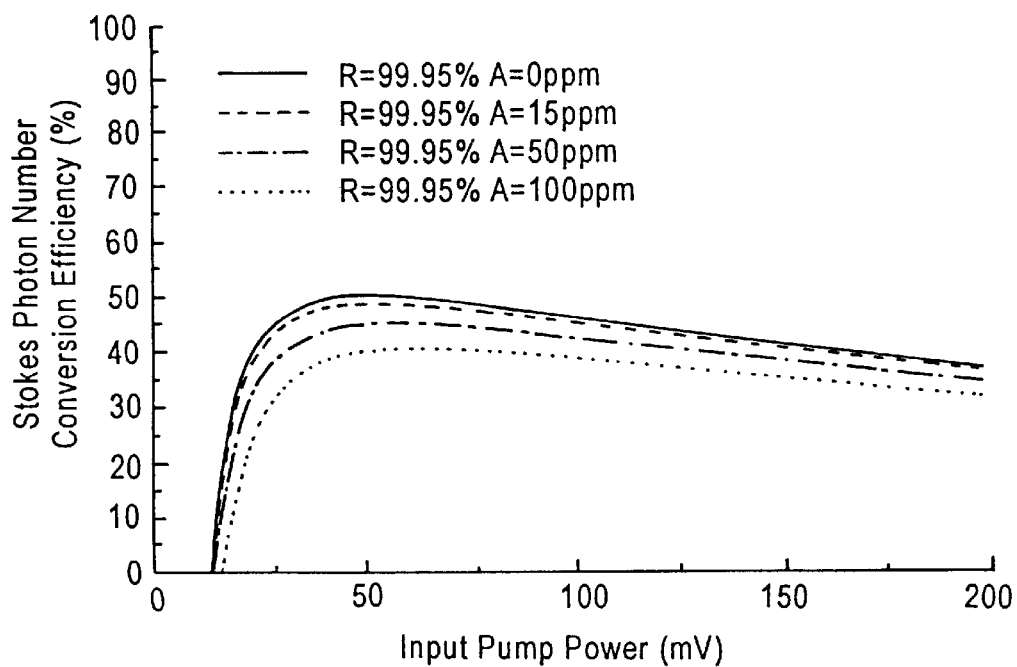
FIG. 7 is a plot of the Stokes photon-conversion efficiency as a function of the input pump power. The pump (Stokes) wavelength is 532 nm (638 nm). The mirror reflectivities at both the pump and the Stokes wavelengths are R=99.95%. The solid dashed, dotted-dashed, and dotted curves were calculated, respectively, for mirror absorptions of A=0, 15, 50, and 100 ppm.

FIG. 7 is a plot of the Stokes photon-conversion efficiency as a function of the input pump power for various mirror absorptions. The mirror reflectivities at both the pump and the Stokes wavelengths are set at R=99.95%, and the mirror absorptions range from 0 to (100 ppm. The higher the absorption, the larger the threshold value of the Raman conversion. Also, larger absorptions result in lower peak-conversion efficiencies. Low-loss mirrors are commercially available with losses that are due to absorption as low as 15 ppm.

The experimental setup used to measure the output Stokes power as a function of the input pump power is similar to the experimental setup described in the Optics Letter, "Continuous-wave Raman Laser in $H_2$," J. K. Brasseur, K. S. Rapsky and J. L. Carlsten, vol. 23, p. 367 (1998). The pump laser wavelength is 532 nm. The Raman medium used in this experiment is $H_2$ at a pressure of 10 atm, and the Raman plan-wave gain coefficient is $a_g$=2.5×10$^{-9}$ cm/W. $H_2$ has a Raman shift of 4155 cm$^{-1}$, thus making the Raman-shifted Stokes wavelength 683 nm. The mirror reflectivity at the pump (Stokes) wavelength is R=99.984% (R=99.984%), and the mirror absorption at the pump (Stokes) wavelength is A=78 ppm (A=78 ppm). The radius of curvature of the mirrors is $R_m$=60 cm, and the cavity length is l=7.8 cm.

Figure 8:
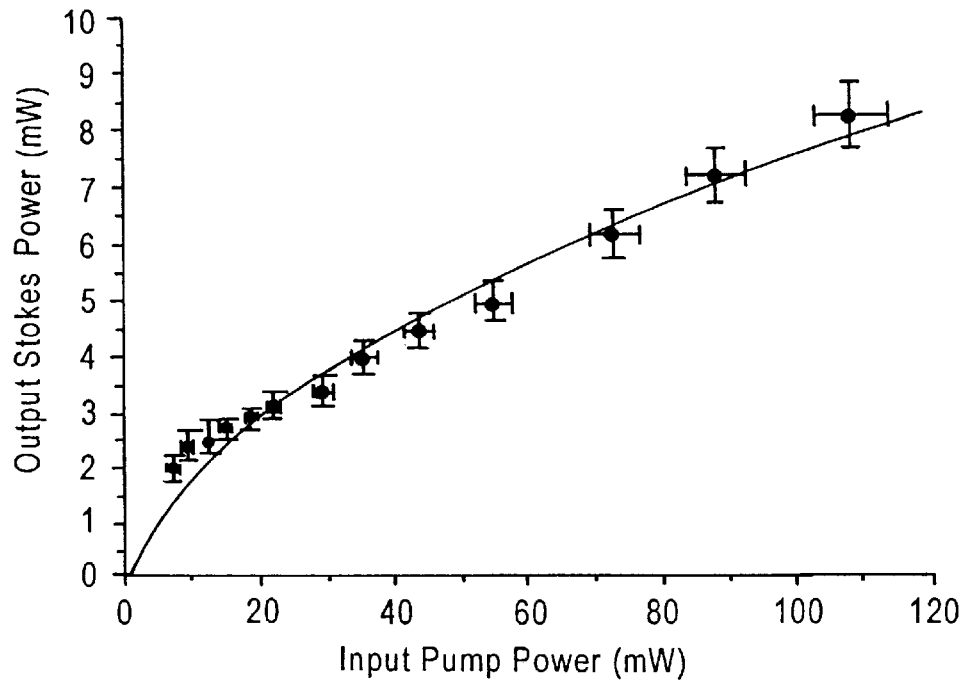
FIG. 8 is a plot of the output Stokes power at 683 nm as a function of the input pump power at 532 nm. The theoretical predictions shown as the solid curve and experimental measurements shown as the filled circles illustrate that the experimental data and the concept are in agreement.

FIG. 8 is a plot of the output Stokes power as a function of the input pump power. The filled circles are the experimental measurements, and the solid curve is the theoretical prediction. The experiment and concept are in agreement. A measure threshold for the cw Raman laser is 2 mW.

Figure 9:
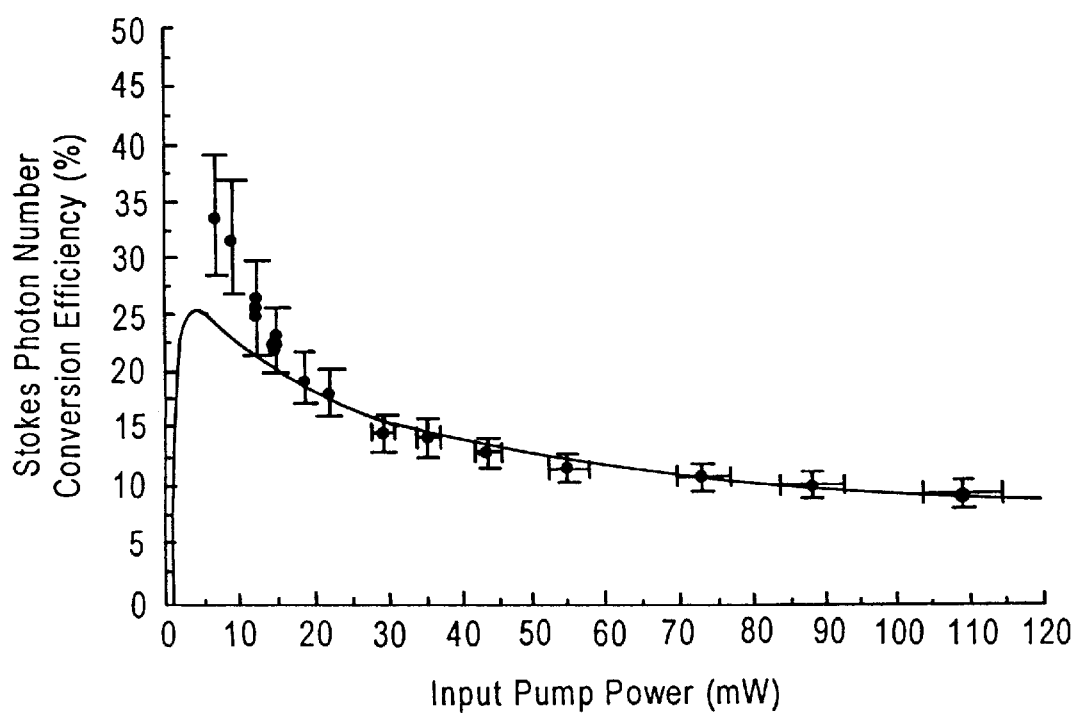
FIG. 9 is a plot of the Stokes photon-conversion efficiency at 683 nm as a function of the input pump power at 532 nm. The theoretical prediction is shown as a solid curve and experimental measurements are shown as filled circles. A maximum Stokes photon-conversion efficiency of 34%±5.4% is also shown.

FIG. 9 is a plot of the Stokes photon-conversion efficiency as a function of the input pump power. The filled circles are experimental points, and the solid curve is the theoretical prediction. The maximum Stokes photon-conversion efficiency for this experimental setup is 84%±5.4%. Note that mirrors with lower reflectivities would be needed to shift the peak conversion efficiency to higher input pump powers [see FIG.(6)].

The depletion factor that gives the maximum Stokes power conversion efficiency can be found from Eq. (22) as $$d_{max} = \frac{TR}{(1-R^2)} \frac{(1-R)^2}{(T^2 + AT)}. \qquad (24)$$

With no absorption (A=0), the depletion factor that gives the maximum Stokes power is $d_{max}$=R/(1+R)=½ for reflectivities of R~1. The maximum Stokes power-conversion efficiency, for A=0, can be found from Eq. (21) with d=½ to be $C_S$(max)=½($\lambda_p\lambda_g$). This sets an upper limit on the conversion efficiency, which will decrease only when absorption of the mirrors is not zero. Finally, the input pump power that gives the maximum conversion efficiency, $P_o$(max), can be found from the relationship $$P_0(max) = \frac{L_s}{2G_s} \frac{(1-\sqrt{R})^2}{T} \frac{1}{d_{max}}. \qquad (25)$$

The design of the Raman laser for maximum conversion efficiency is governed by Eqs. (24) and (25). The input pump power that is governed by the pump laser needs to be matched to the HFC with mirrors at the proper reflectivity and transmission so that Eqs. (24) and (25) are satisfied.

Figure 10:
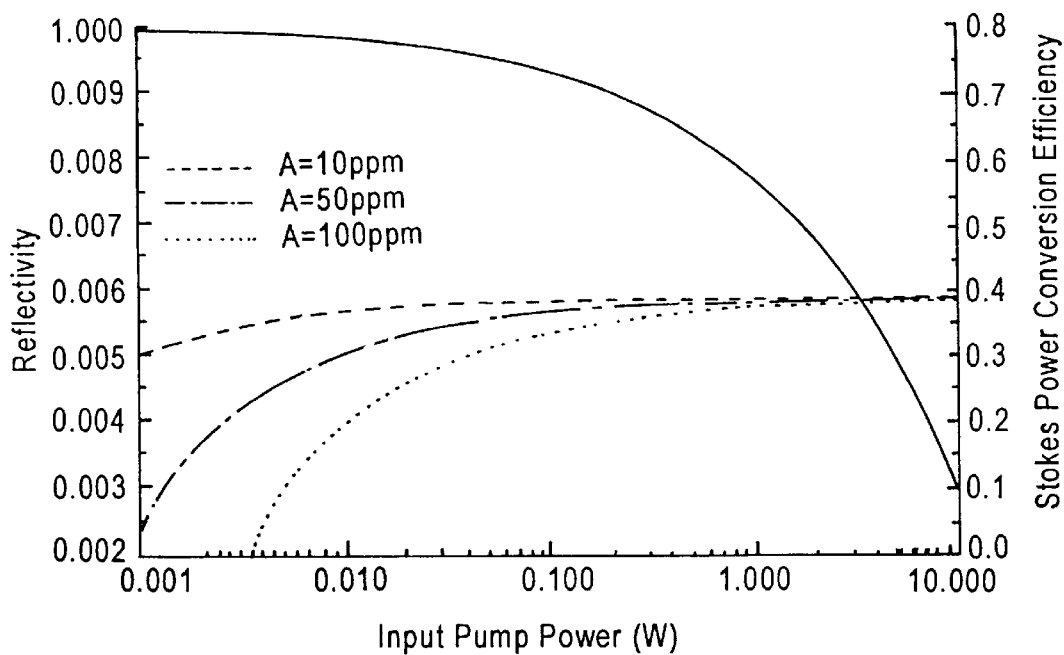
FIG. 10 is a solid line curve of the reflectivity that yields the maximum Stokes power-conversions efficiency as a function of the input pump power. The pump (Stokes) wavelength is 532 nm (683 nm). Also the maximum Stokes power-conversion efficiency as a function of the input pump power is shown for absorptions of A=15 ppm (dashed curve), A=50 ppm (dotted-dashed curve), and A=100 ppm (dotted curve).
Figure 11:
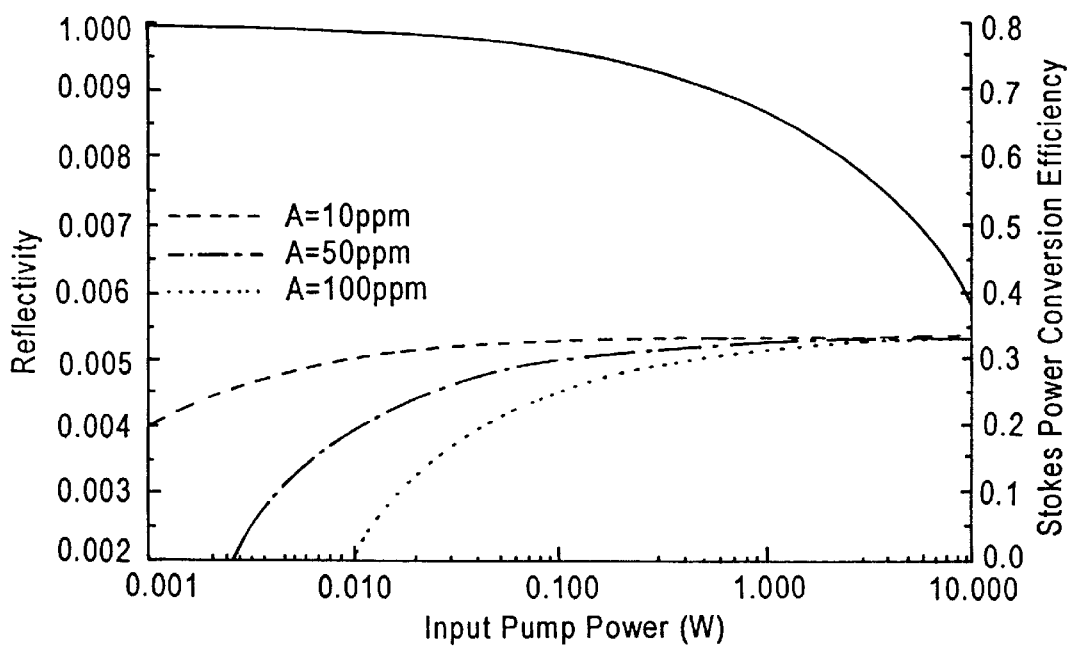
FIG. 11 is the same as FIG. 9 except that the pump (Stokes) wavelength is 795 nm (1187 nm).
Figure 12:
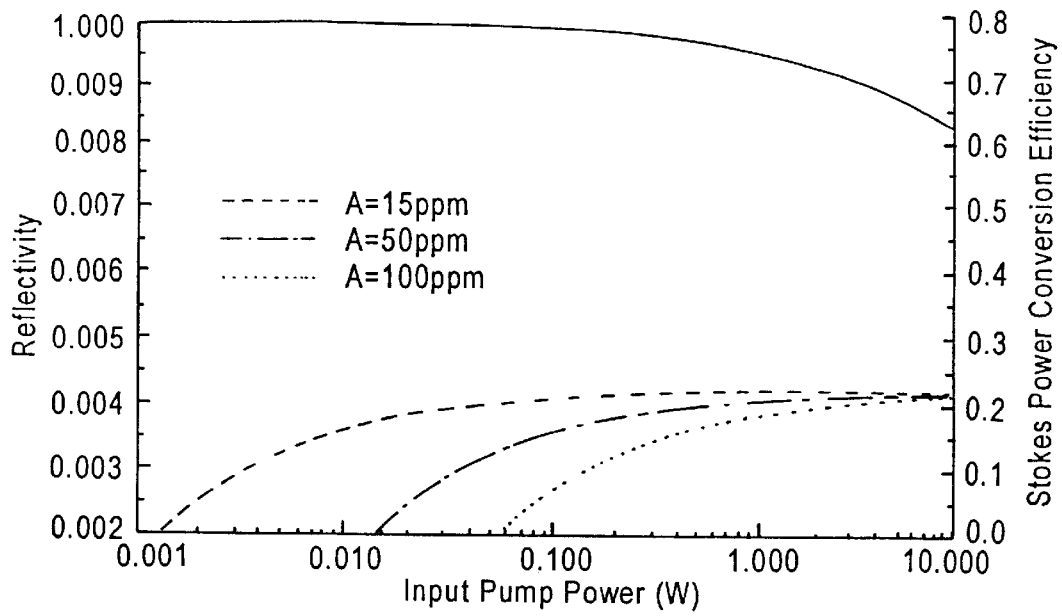
FIG. 12 is the same as FIG. 9, except that the pump (Stokes) wavelength is 1330 nm (2973 nm).
Figure 13:
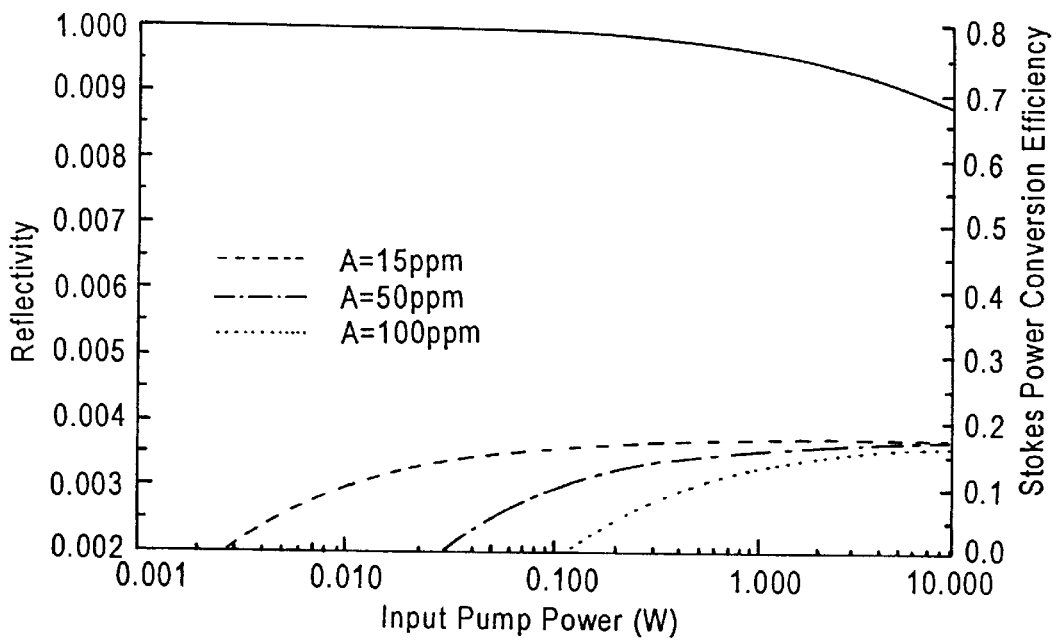
FIG. 13 is the same as FIG. 9, except that the pump (Stokes) wavelength is 1550 nm (4350 nm).

FIG. 10 can be used to design a cw Raman laser for a pump laser at 532 nm and a Raman medium of $H_2$. The input power of the pump laser is assumed to be known. The mirror reflectivity that yields the maximum Stokes power-conversion efficiency is read from the upper curve (solid curve), and the maximum conversion efficiency is then read from the series of three lower curves, depending on the absorption of the mirrors. The dashed curve corresponds to an absorption of 15 ppm, the dotted-dashed curve corresponds to an absorption of 50 ppm, and the dotted curve corresponds to an absorption of 100 ppm. FIGS. 11–13 are the same as FIG. 10 except the pump lasers have wavelengths of 795 nm, 1330 nm and 1550 nm, respectively.

A steady-state concept for the off-resonant cw Raman laser has been presented. This concept predicts a maximum photon-conversion efficiency of 50%. For a 532 nm pump wavelength and a 683-nm Stokes wavelength, the threshold can be as low as 1 mW and the power-conversion efficiency as high as 39%.

The concept was compared with measurements taken with a cw Raman laser that has a pump of 532 nm and a Raman medium of $H_2$. The cw Raman laser had a measured threshold for the pump power of 2 mW and a maximum Stokes photon-conversion efficiency of 34%±5.4%. The experiment is well modeled by the steady-state concept.

As a result of the relation between the pump power threshold and the finesse of the cavity needed to achieve a Raman shifted wavelength the present invention is realized. By using a high finesse cavity the reflectance R≈1, therefore ln (R)≈–1+R. By making this substitution into equation 14, then substituting the new Ls into equation (21) leaves the following equation $$Po(th) = \frac{c(1-R)(1-\sqrt{R})^2}{2lGsT} \qquad (26)$$

where T=1–R. Therefore if 1–R is substituted for T the resulting equation is $$Po(th) = \frac{c(1-\sqrt{R})^2}{2lGs} \qquad (27)$$

By then making the substitution of $(1-T)^{1/2}$ for $R^{1/2}$, because R is extremely large, the following equation is realized $$\sqrt{R} \approx 1 - \frac{1}{2}T \quad (28)$$

Therefore, it is plain to see than $1-R^{1/2} \approx \frac{1}{2} T$. Using this equality/approximation in equation (27) yields $$Po(th) = \frac{cT^2}{2lGs} \quad (29)$$

Because the square root of the reflectance, $R^{1/2} \approx 1$, one of skill in the art would know that the transmittance, $T \approx \pi/F$. By using this realization, the exquisite relationship between the pump power threshold and the finesse of the cavity is realized through equation (29) to be $$P(th) = \frac{c\pi^2}{2lGsF} \quad (30)$$

It is therefore apparent that the pump power threshold needed to achieve a Raman shifted wavelength in a nonconfocal cavity is inversely related to the finesse of the cavity. Prior to the present invention, as stated earlier, the idea of using a high reflectance (or high finesse) cavity with a Raman media was counterproductive as a result of the high power needed to achieve the Stokes gain.

Finally, a simple method for designing cw Raman lasers has been presented. These designs operate near the maximum conversion efficiency and have threshold powers for the pump laser as low as 1 mW. These low threshold values imply that room-temperature diode lasers can be used to pump the cw Raman laser. The Raman-shifted wavelengths of these cw Raman lasers pumped by the available room-temperature diode lasers open up an information-rich spectroscopic region in the mid-infrared part of the spectrum.

An example of a highly tunable, or off-resonant, Raman laser includes a tunable pump laser that emits a tunable source beam into a nonconfocal cavity containing a Raman medium. The nonconfocal cavity comprises two curved mirrors each having a high reflectivity, thereby producing a cavity with a high finesse.

Figure 3:
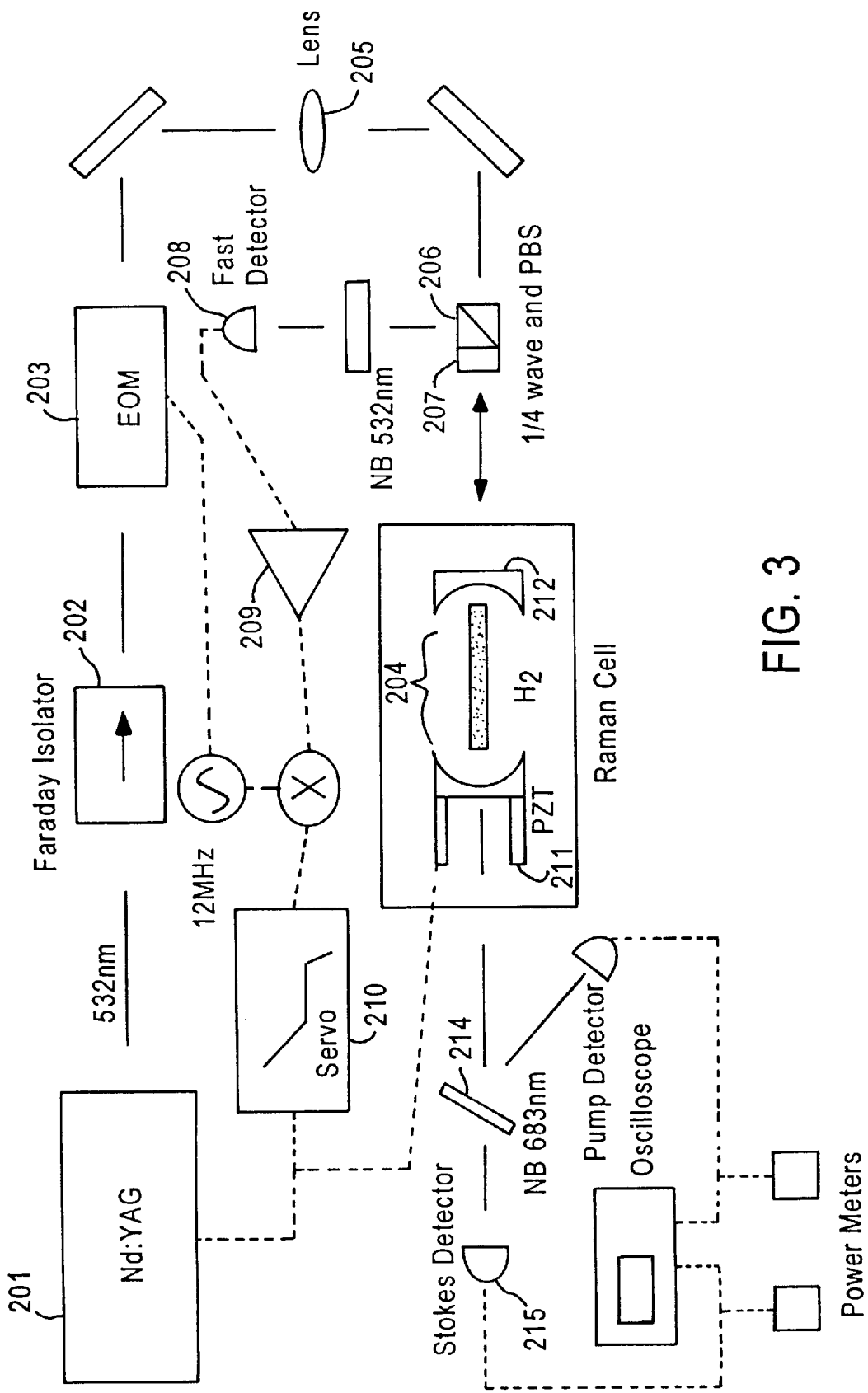
FIG. 3 is a controlled Raman laser according to one embodiment of the present invention.

As discussed above, when the source beam emitted from the pump laser enters the nonconfocal cavity, a resonant standing wave is created. As a result of the square of the high finesse of the cavity being inversely proportionate to the power threshold required to sustain a Raman shifted wavelength, a highly tunable, or off-resonant, Raman shifted output is achieved. The Raman shifted output can be finely tuned by adjusting the cavity length with a piezoelectric driving element. As seen in FIG. 3, a frequency-doubled cw Nd: YAG laser (201) with output powers up to 200 mW is used. The output of this Nd: YAG laser at 532 nm was sent through a Faraday isolator (202) to minimize feedback to the Nd: YAG laser. An electro-optic modulator (EOM 203)) was used to place sidebands on the carrier frequency required for locking the pump to the cavity (204). The laser beam traveled though a two-element lens pair (205) used to mode match the pump beam to the cavity. A polarizing beam splitter (PBS 206) cube in conjunction with a quarter-wave plate (207) allowed for monitoring of the beam reflected from the cavity. A fast detector (208) was then used to measure the error signal. A low-noise amplifier (209) gave the signal 30 dB of amplification before the signal was mixed to dc. The error signal entered the servo (210), and the slow corrections were sent to temperature tune the pump laser, while the fast corrections were sent to the pump laser piezoelectric transducer (PZT 211).

To ensure that the Stokes and pump cavity resonances fall within a Raman linewidth, either the pump laser (201) or the Raman cavity (204) must be scanned until a resonance occurs. This embodiment requires a scan of seven free-spectral ranges (~20 GHz) to guarantee this overlap. However, the pump laser used in this embodiment does not have enough tuning range to cover the needed seven free-spectral ranges. Therefore a PZT (211) was placed inside the Raman cell to adjust the cavity length. The Raman cavity was tuned though pump resonance until the Stokes output was seen. The second mirror (212) was then adjusted mechanically by a New Focus picomotor (213) until the Stokes output corresponded to a zero voltage on the cavity PZT. The picomotor and the cavity PZT were turned off, and the laser was locked to the doubly resonant cavity line.

The Raman cavity used in this embodiment used cavity mirrors having a radius of curvature of 50 cm that were spaced apart by 7.28 cm, made of ULE 7971 from Corning.

The output of the cw Raman laser was measured at the exit of the cavity, with a narrow-band filter (214) at 683 nm placed in the beam at a slight angle to separate the pump ($\lambda_1$) and the Stokes ($\lambda_2$) beams. The output power of the pump laser was varied and the pump laser was locked to the cavity. The average pump and Stokes powers were measured, and a photodiode (215) was used to monitor the amplitude noise of the Stokes beam.

In still another embodiment however, a tunable pump laser can be used which covers the needed seven free-spectral ranges, thereby eliminating the need for a PZT cavity adjuster.

However in a further embodiment comprising the tunable pump laser, the cavity is filled with a diatomic medium. An example of such a medium is diatomic hydrogen, $H_2$. In one example of such an embodiment, the cavity was filled with 10 atm of $H_2$, resulting in a Raman linewidth (FWHM) of 510 MHz.

Those skilled in the art will recognize, or be able to ascertain using no more than routine experimentation, many equivalents to the specific embodiments of the invention specifically described herein. Such equivalents are intended to be encompassed in the scope of the following claims.

What is claimed is:

1. A laser comprising:

a pump laser;

a cavity comprising at least one mirror having a particular finesse; and a Raman medium within the cavity, wherein the particular finesse of the cavity is large enough for the pump laser to sustain an off-resonant Raman shifted output; and a pump power threshold is substantially inversely proportionate to a square of the particular finesse.

2. A Raman laser comprising:

a pump laser; and a cavity comprising two mirrors bounding a Raman medium, wherein the pump laser which pumps the cavity comprising the Raman medium so as to generate a sustained Raman shifted output, has a power output on the order of milliwatts, and the finesse of the cavity is large enough to model a pump laser power threshold, required to sustain an off-resonant Raman shifted wavelength, to an inverse proportionate square of the finesse.

3. The Raman laser according to claim 2,
wherein the pump laser is a laser chosen from the group consisting of Nd:YAG, diode, and He—Ne.

4. The Raman laser according to claim 3,
wherein the pump laser is tunable.

5. The Raman laser according to claim 4, further comprising:
a piezoelectric element which adjusts the position of at least one of the mirrors in the in order to tune the off-resonant Raman laser.

6. A Raman laser comprising:
a pump laser; and
a cavity comprising two mirrors bounding a Raman medium,
wherein
the pump laser pumps the cavity comprising the Raman medium so as to generate a sustained Raman shifted output,
a finesse of the cavity is large enough for the pump laser to sustain an off-Resonant Raman shifted output, and
a pump power threshold is substantially inversely proportionate to a square of the finesse.

7. The Raman laser of claim 6, wherein the pump laser is a laser chosen from a group consisting of Nd:YAG, diode, and He—Ne.

8. The Raman laser of claim 6, wherein the pump laser is tunable.

9. The Raman laser of claim 6, further comprising
a piezoelectric element which adjusts the position of at least one of the mirrors in the cavity in order to tune the off-resonant Raman laser.

10. A laser comprising:
a continuous wave pump laser;
a cavity comprising a mirror having a particular finesse; and
a Raman medium within the cavity,
wherein
the particular finesse of the cavity is large enough for the pump laser to sustain an off-resonant Raman shifted output; and
a pump power threshold is substantially inversely proportionate to a square of the particular finesse.

11. The laser of claim 10, wherein the continuous wave pump laser comprises a diode laser.

12. A laser comprising:
a continuous wave pump laser;
a cavity having a finesse; and
a Raman medium within the cavity,
the finesse of the cavity being large enough to model a pump laser power threshold, required to sustain a Raman shifted wavelength, to an inverse proportionate square of the finesse.

13. The laser according to claim 12,
wherein the continuous wave pump laser comprises a Nd:YAG laser.

14. The laser according to claim 12,
wherein the continuous wave pump laser comprises a diode laser.

15. The laser according to claim 12,
wherein the continuous wave pump laser comprises a He—Ne laser.

16. A laser comprising:
a pump laser;
a cavity comprising two mirrors having a finesse; and
a Raman medium within the cavity,
the finesse of the cavity being large enough to model a pump laser power threshold, required to sustain an off-resonant Raman shifted wavelength, to an inverse proportionate square of the finesse,
wherein the pump laser pumps the cavity comprising the Raman medium, thereby generating a sustained off-resonant Raman shifted output.

17. The laser according to claim 16, further comprising:
a piezoelectric element which adjusts the position of one of the mirrors in the cavity in order to tune the off-resonant Raman laser.

18. The laser according to claim 17,
wherein the pump laser is tunable.

19. A laser comprising:
a pump laser;
a cavity having a finesse; and
a Raman medium within the cavity,
the finesse of the cavity being large enough to model a pump laser power threshold, required to sustain an off-resonant Raman shifted wavelength, to an inverse proportionate square of the finesse,
wherein the pump laser which pumps the cavity comprising the Raman medium, thereby generating a sustained Raman shifted output, has a power output on the order of milliwatts.

20. The laser of claim 19,
wherein the Raman medium is a diatomic medium.

21. The laser of claim 20,
wherein the diatomic medium is diatomic hydrogen, $H_2$.

22. A laser comprising:
a pump laser;
a cavity comprising two mirrors having a particular finesse; and
a Raman medium within the cavity,
wherein
the particular finesse of the cavity is large enough for the pump laser to sustain an off-resonant Raman shifted output; and
a pump power threshold is substantially inversely proportionate to a square of the particular finesse.

23. The laser of claim 22, further comprising a piezoelectric element which adjusts the position of at least one of the two mirrors in the cavity in order to tune the off-resonant Raman laser.

24. The laser of claim 22, wherein the pump laser is tunable.

25. A method of generating a continuous wave, off-resonant Raman-shifted wavelength comprising the steps of:
pumping a cavity comprising two mirrors bounding a Raman medium with a pump laser,
wherein
the pump laser that pumps the cavity has a power output on the order of milliwatts, and
the finesse of the cavity is large enough to model a pump laser power threshold, required to sustain an off-resonant Raman shifted wavelength, to an inverse proportionate square of the finesse.

26. The method according to claim 25,
wherein the pump laser is a laser chosen from the group consisting of Nd:YAG, diode, and He—Ne.

27. The method according to claim 26,
wherein the pump laser is tunable.

28. The method according to claim 27, further comprising the step of:

adjusting the position of one of the mirrors in the cavity with a piezoelectric element in order to tune the off-resonant Raman laser.

29. A method of generating a Raman-shifted wavelength comprising the steps of:

pumping a cavity comprising two mirrors bounding a Raman medium with a pump laser so as to generate a sustained Raman shifted output, wherein a finesse of the cavity is large enough for the pump laser to sustain an off-resonant Raman shifted output, and a pump power threshold is substantially inversely proportionate to a square of the finesse.

30. The method of claim 29, wherein the pump laser is a laser chosen from a group consisting of Nd:YAG, diode, and He—Ne.

31. The method of claim 29, wherein the pump laser is tunable.

32. The method of claim 29, further comprising the step of:

adjusting the position of at least one of the mirrors in the cavity with a piezoelectric element in order to tune the off-resonant Raman laser.

33. A method of generating a laser output comprising the steps of:

pumping a cavity having a finesse and containing a Raman medium with a continuous wave pump laser, wherein the finesse of the cavity is large enough to model a pump laser power threshold, required to sustain a Raman shifted wavelength, to an inverse proportionate square of the finesse.

34. The method according to claim 33, wherein the continuous wave pump laser is a Nd:YAG laser.

35. The method according to claim 33, wherein the continuous wave pump laser is a diode laser.

36. The method according to claim 33, wherein the continuous wave pump laser is a He—Ne laser.

37. A method of generating a laser output comprising:

pumping a cavity comprising two mirrors having a finesse and containing a Raman medium with a pump laser, wherein the finesse of the cavity is large enough to model a pump laser power threshold, required to sustain an off-resonant Raman shifted wavelength, to an inverse proportionate square of the finesse, wherein the pump laser pumping the cavity comprising the Raman medium, generates a sustained off-resonant Raman shifted output.

38. The method according to claim 37, further comprising the step of:

adjusting the position of one of the mirrors in the cavity, in order to tune the off-resonant Raman laser, with a piezoelectric element.

39. The method according to claim 38, wherein the pump laser is tunable.

40. A method of generating a laser output comprising:

pumping a cavity having a finesse and containing a Raman medium with a pump laser, wherein the finesse of the cavity is large enough to model a pump laser power threshold, required to sustain an off-resonant Raman shifted wavelength, to an inverse proportionate square of the finesse, and wherein the pump laser has a power output on the order of milliwatts.

41. The method according to claim 40, wherein the Raman medium is a diatomic medium.

42. The method according to claim 41, wherein the diatomic medium is diatomic hydrogen, $H_2$.

* * * * *

UNITED STATES PATENT AND TRADEMARK OFFICE
CERTIFICATE OF CORRECTION

PATENT NO.   : 6,151,337
DATED        : November 21, 2000
INVENTOR(S)  : John Carlsten et al.

It is certified that error appears in the above-identified patent and that said Letters Patent is hereby corrected as shown below:

Column 1,
Line 3, please insert after the title "CONTINOUS-WAVE RAMAN LASER HAVING A HIGH-FINESSE CAVITY" section and before the "FIELD OF THE INVENTION" section, -- GOVERNMENT SUPPORT
This invention was made with government support under grant number PHY-9424637 awarded by The National Science Foundation. The government has certain rights in the invention. --

Signed and Sealed this

Twenty-second Day of March, 2005

JON W. DUDAS
*Director of the United States Patent and Trademark Office*